United States Patent [19]
Dubois

[11] Patent Number: 6,056,019
[45] Date of Patent: May 2, 2000

[54] APPARATUS FOR ACOUSTICALLY ISOLATING A HIGH PRESSURE STEAM PIPE IN A FLOODED STRUCTURE

[75] Inventor: Neil J. Dubois, Cranston, R.I.

[73] Assignee: The United States of America as represented by the Secretary of the Navy, Washington, D.C.

[21] Appl. No.: 09/152,466

[22] Filed: Sep. 8, 1998

[51] Int. Cl.[7] .............................. F16L 9/18; F16L 59/12
[52] U.S. Cl. ...................... 138/149; 138/148; 138/113; 138/114
[58] Field of Search ...................... 138/149, 148, 138/111–114, 108; 62/55; 181/207

[56] References Cited

U.S. PATENT DOCUMENTS

| | | | |
|---|---|---|---|
| 2,089,909 | 8/1937 | Mansfield | 138/148 X |
| 3,126,918 | 3/1964 | Eaton | 138/114 X |
| 3,467,143 | 9/1969 | Croft | 138/148 X |
| 3,595,275 | 7/1971 | Steans | 138/114 |
| 3,882,382 | 5/1975 | Johnson | 138/114 X |
| 4,233,816 | 11/1980 | Hensley | 138/148 X |
| 4,436,119 | 3/1984 | Shahan et al. | 138/114 X |
| 5,497,809 | 3/1996 | Wolf | 138/114 X |

*Primary Examiner*—Patrick Brinson
*Attorney, Agent, or Firm*—Michael J. McGowan; James M. Kasischke; Prithvi C. Lall

[57] ABSTRACT

An acoustically isolated structure for use on a high temperature pipe in a fluid environment is disclosed. Thermal insulation is provided radially outward from and adjacent to the pipe, and a sleeve is located on the outer surface of the insulation preventing environmental fluid from damaging the thermal insulation. A spacer is joined to the sleeve to position an acoustical barrier away from the pipe. The spacer allows environmental fluid circulation between the sleeve and the acoustical barrier.

12 Claims, 3 Drawing Sheets

APPARATUS FOR ACOUSTICALLY ISOLATING A HIGH PRESSURE STEAM PIPE IN A FLOODED STRUCTURE

CROSS-REFERENCE TO RELATED PATENT APPLICATION

This patent application is co-pending with a patent application entitled ISOLATION SYSTEM FOR A HIGH PRESSURE STEAM PIPE IN A FLOODED STRUCTURE (Attorney Docket No. 77945) having the same filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to acoustics and to apparatus for acoustically isolating a high-pressure steam line located within a flooded structure. More particularly, the present invention relates to such apparatus through which acoustic energy generated in the steam pipe assembly is prevented from radiating out into the surrounding fluid.

(2) Brief Description of the Prior Art

The acoustic isolation of high-pressure steam lines used to test equipment for torpedo drive train system presents certain unique challenges. That is, the acoustic measurement of noise caused by torpedo drive train systems is sometimes measured in a large fluid filled structure in which the torpedo is mounted. In one possible application, high-pressure steam can be used to power the vehicle for subsequent noise testing. This steam is transported to the vehicle via a piping system which runs from the steam generation source through the structure's wall and then through the fluid filled interior of the structure to the vehicle.

The prior art discloses various means for insulating pipes and tubing against the transmission of sound, heat or other forms of energy.

U.S. Pat. No. 3,595,275 to Stearns et al., for example, discloses a spacer for semiflexible coaxial tubing which comprises a strip of fibrous thermal insulating material having an abrasive resistant facing helically wound with opposite pitch around an inner tube. The spacer may include a moisture impermeable package, enclosing particles which functions as one or both of the facings after rupture to expose the particles. The spacer is used in coaxial tubing having evacuated annular spaces that provide an annular concentric space for flow of fluid between said evacuated spaces. Stearns et al. do not teach acoustic shielding or provide for high temperature fluids in the tubing.

U.S. Pat. No. 4,436,119 to Shahan et al. discloses a system for insulating and isolating a pipe, thermally and acoustically, from its outer metallic cover. The system consisting of a pipe jacket providing an external cover, an inner body of insulation such as fiberglass or the like, a vibration absorption unit and a series of spacers yieldably separating the jacket from the pipe to be insulated. However, the invention taught by Shahan et al. is inapplicable to underwater environments because the acoustic shielding does not account for the entry of fluid.

U.S. Pat. No. 4,962,826 to House discloses a damping treatment for bodies where the temperature may rise above 150° C. which consists of a number of stand-off cantilever, sandwich type dampers, consisting of a layer of viso-elastic material sandwiched between two rigid metal plates. These plates are attached to a support that can be attached to the body. The support is thermally isolated from the body and is positioned at a position having a high amplitude of the radiating frequency that is to be reduced.

U.S. Pat. No. 5,253,680 to Matsumoto discloses a duplex metal pipe for damping wherein an inner pipe is inserted into an outer pipe with a clearance of 10 mm to 150 mm provided between surface of the outer pipe and the outer surface of the inner pipe. The outer pipe and inner pipe are formed of steel pipe. It is disclosed that within the specific clearance range, the effect of heat changes or damping can be overcome. However, Matsomoto does not account for expansion or bends in the pipe or allow environmental fluid to be incorporated in the area between the pipes.

Accordingly, the prior art does not provide for isolating the noise from the high-pressure steam traveling down the steam supply pipe from the fluid surrounding it to allow meaningful noise measurements of a vehicle under test.

SUMMARY OF THE INVENTION

A first object of this invention is isolating acoustic energy from a pipe in a fluid environment.

A second object is that such invention be useful when the pipe is carrying a high temperature fluid.

Another object of the present invention is to provide an apparatus for isolating acoustic energy in a high-pressure steam pipe assembly from a surrounding fluid medium to allow for high quality sound measurement.

The present invention is an acoustically isolated structure for use on a high temperature pipe in a fluid environment. Thermal insulation is provided radially outward from and adjacent to the pipe, and a sleeve is located on the outer surface of the insulation preventing environmental fluid from damaging the thermal insulation. A spacer is joined to the sleeve member to position an acoustical barrier away from the pipe. The spacer allows environmental fluid circulation between the sleeve and the acoustical barrier.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT

Figure 1:
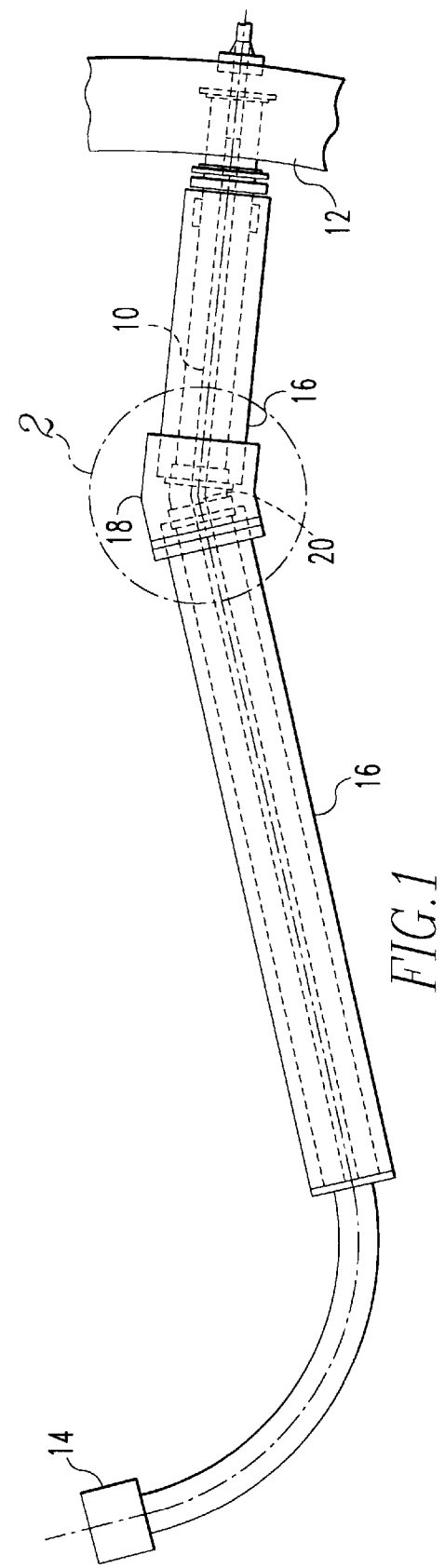
FIG. 1 is a side view of a high-pressure steam line incorporating a preferred embodiment of the apparatus of the present invention.

FIG. 1 shows a layout drawing of a high-pressure steam line inside a fluid filled noise-testing structure 12. The steam pipe 10 passes through the wall of the structure 12 and then to the vehicle being tested 14. Surrounding the steam pipe 10 are acoustic barrier 16 and bent acoustic barrier 18. Acoustic barrier 16 is cylindrical with an aperture therethrough in order to completely surround pipe 10. It will be observed that there is a bend 20 in the steam pipe 10, and there is a gap in the acoustic barrier 16 adjacent the bend 20. Bent acoustic barrier 18 is combined from two cylindrical sections joined at an angle in order to be complementary to bend 20. The diameter of each cylindrical section is greater than the outer diameter of acoustic barrier 16. Acoustic barrier 18 covers the bend 20 and overlaps the ends of acoustic barrier 16.

Figure 2:
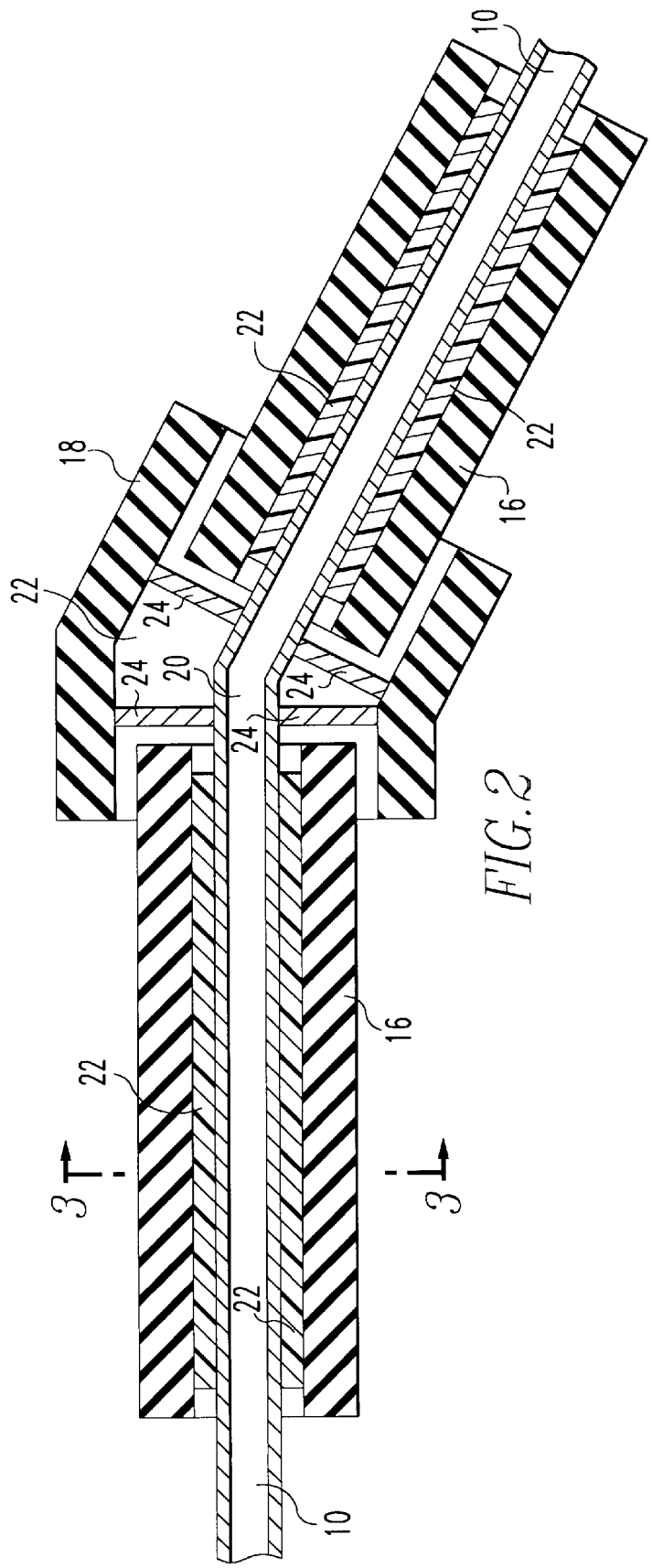
FIG. 2 is an enlarged cross sectional view of circle 2 in FIG. 1.

A more detailed view of the isolation apparatus is shown in FIG. 2. Here it can be seen that the steam pipe assembly 10 is encased in acoustic barrier 16 and bent acoustic barrier 18. These barriers are constructed of an absorptive, closed cell ionomer foam, in this case high density SOFTLITE® ionomer foam manufactured by the Gilman Corp., Gilman, Conn. Acoustic barrier 16 is supported at a standoff distance from the steam pipe 10 by standoff 22. Another separate acoustic barrier 18 is supported by another standoff distance from the steam pipe 10 by standoff 24. These standoffs are segmented. Thus the fluid surrounding the structure can completely fill the area between the acoustic barriers 16 and 18 and the pipe assembly 10.

Figure 3:
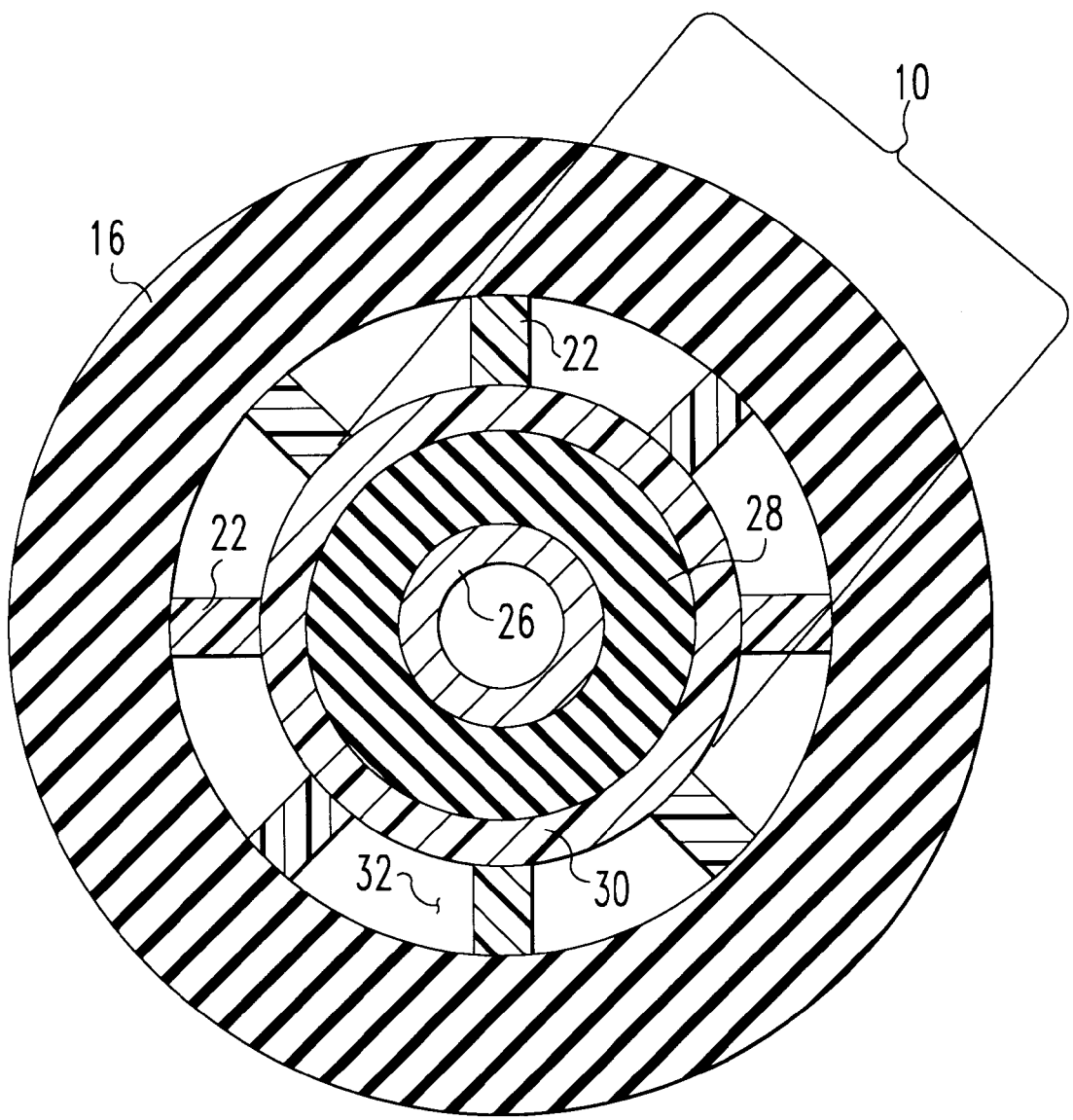
FIG. 3 is a cross section through 3—3 in FIG. 2.

Referring to FIG. 3, the purpose of the standoffs is readily apparent. The steam pipe assembly 10 includes a steel supply pipe 26, a layer of insulation 28 and a sealing sleeve of plastic 30. It will be appreciated that, for the purposes of clarity, the pipe section 10 is schematically shown as enlarged over the steam pipe assembly in FIG. 2. The layer of insulation 28 is superimposed over the supply pipe 26. The sealing sleeve 30 is superimposed over the insulation 28. The insulation prevents heat transfer from the steam within supply pipe 26 to the cooler surrounding fluid thereby preventing condensation of the steam in transit. Typical pipe insulation will not hold up to water immersion, however, and thus the sealing sleeve 30 is required. In turn, fluid cooling of the plastic sleeve 30 is necessary to keep internal temperatures from surpassing the melting point of typical plastic materials, thus the fluid 32 must be allowed to contact the outside of the steam pipe assembly 10 directly. Standoffs 22 for the acoustic barriers allow free flooding of the volume between sleeve 30 and acoustic barriers 16 and 18.

The acoustic barriers 16 and 18 are of different diameters and overlapped to accommodate the cooling and isolation requirements concurrently. The break 20 between barriers 16 and 18 allows for fluid to enter and fill the space 32 between the pipe assembly 10 and the acoustic barrier 16 and 18. By overlapping the barriers 16 and 18, no direct path for acoustic energy exists between the pipe assembly 10 and the fluid medium.

The standoffs 22 and 24 are fabricated out of the same plastic used in the sealing sleeve 30 and can thus be easily bonded or welded to it. The acoustic barriers are fabricated as cylinders that are then slit lengthwise and hinged to provide a clamshell, which can be placed over the standoff assembly and then held in place with band clamps.

Those skilled in the art will appreciate that an advantage of the apparatus invention is its ability to isolate acoustic energy in a high-pressure steam pipe assembly from a surrounding fluid medium to allow for high quality sound measurement. The apparatus of this invention also allows for cooling of the steam pipe assembly. The use of a high density ionomer foam allows the acoustic barriers to be fabricated as hinged cylinders with sufficient structural rigidity to maintain shape and standoff distances during the fill and empty stages of an acoustic test.

While the present invention has been described in connection with the preferred embodiments of the various elements, it is to be understood that other similar embodiments may be used or modifications and additions may be made to the present described invention without deviating therefrom. Therefore, the present invention should not be limited to any single embodiment, but rather construed in breadth and scope in accordance with the recitation of the appended claims.

What is claimed is:

1. An acoustically isolated structure for use on a high temperature pipe in a fluid environment comprising:

thermal insulation means positioned radially outward from and adjacent to said pipe;

a fluid resistant sleeve member positioned radially outward from and directly adjacent to said insulation means, said sleeve member preventing communication between said environmental fluid and said thermal insulation means;

a spacer means joined to said sleeve member; and an acoustical barrier means joined outside said spacer means and surrounding said pipe, said spacer means allowing environmental fluid between said sleeve member and said acoustical barrier.

2. The structure of claim 1 wherein the spacer means comprises a plurality of radial standoffs longitudinally interposed between the sleeve and said acoustical barrier means.

3. The structure of claim 2 wherein the standoffs are circumferentially spaced from one another.

4. The structure of claim 2 wherein the sleeve member is a plastic sleeve.

5. The structure of claim 4 wherein the standoffs are made from a plastic material which is the same material as used in the plastic sleeve.

6. An acoustically isolated structure for use on a high temperature pipe in a fluid environment comprising:

thermal insulation means positioned radially outward from and adjacent to said pipe;

a plastic sleeve positioned radially outward from and adjacent to said insulation means, said plastic sleeve preventing communication between said environmental fluid and said thermal insulation means;

a plurality of radial standoffs welded to the plastic sleeve; and an acoustical barrier means joined outside said radial standoffs and surrounding said pipe, said radial standoffs allowing environmental fluid between said plastic sleeve and said acoustical barrier.

7. The structure of claim 6 wherein the acoustical barrier means is made from an absorptive closed cell ionomer foam.

8. The structure of claim 7 wherein said acoustical barrier means comprises:

at least two cylinder portions made from a cylindrical portion of absorptive closed cell ionomer foam sectioned lengthwise, and a hinge portion joining said cylinder portions together longitudinally.

9. The structure of claim 1 wherein the high temperature pipe is high-pressure steam pipe.

10. An acoustically isolated structure for use on a high temperature pipe in a fluid environment comprising:

thermal insulation means positioned radially outward from and adjacent to said pipe;

a sleeve member positioned radially outward from and adjacent to said insulation means, said sleeve member preventing communication between said environmental fluid and said thermal insulation means;

a spacer means joined to said sleeve member;

an acoustical barrier means joined outside said spacer means and surrounding said pipe, said spacer means allowing environmental fluid between said sleeve member and said acoustical barrier;

a second spacer means joined to said sleeve; and a second acoustical barrier means joined to said second spacer means and positioned to overlap said acoustical barrier means in part, said second acoustical barrier means being capable of accommodating features of said pipe.

11. The structure of claim 10 wherein said second spacer means, said sleeve and said second acoustical barrier means define intermediate spaces and environmental fluid fills said intermediate spaces.

12. The structure of claim 11 wherein the high temperature pipe is high-pressure steam pipe.

* * * * *